United States Patent
Chen et al.

(10) Patent No.: US 11,567,916 B2
(45) Date of Patent: Jan. 31, 2023

(54) EVALUATING QUERY PERFORMANCE

(71) Applicant: INTERNATIONAL BUSINESS MACHINES CORPORATION, Armonk, NY (US)

(72) Inventors: Xiao Xiao Chen, Beijing (CN); Shuo Li, Beijing (CN); Xiaobo Wang, Beijing (CN); ShengYan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 16/813,873

(22) Filed: Mar. 10, 2020

(65) Prior Publication Data

US 2021/0286784 A1 Sep. 16, 2021

(51) Int. Cl.
| | |
|---|---|
| *G06F 16/2453* | (2019.01) |
| *G06F 16/21* | (2019.01) |
| *G06F 16/2452* | (2019.01) |
| *G06N 20/00* | (2019.01) |

(52) U.S. Cl.
CPC ...... *G06F 16/217* (2019.01); *G06F 16/24524* (2019.01); *G06N 20/00* (2019.01)

(58) Field of Classification Search
CPC .................... G06F 16/2453; G06F 16/24542
See application file for complete search history.

(56) References Cited

U.S. PATENT DOCUMENTS

| | | | |
|---|---|---|---|
| 6,219,660 B1 | 4/2001 | Haderle | |
| 2008/0222093 A1 | 9/2008 | Fan | |
| 2010/0223253 A1 | 9/2010 | Gopal | |
| 2012/0109873 A1* | 5/2012 | Xiong | G06Q 30/01 706/52 |
| 2015/0286684 A1* | 10/2015 | Heinz | G06F 16/2452 707/769 |
| 2017/0116275 A1* | 4/2017 | Baggett | G06F 16/2462 |
| 2019/0034485 A1 | 1/2019 | Arnold | |
| 2020/0210387 A1* | 7/2020 | Brown | G06N 5/04 |
| 2020/0320100 A1* | 10/2020 | Piecko | G06F 16/26 |
| 2020/0349161 A1* | 11/2020 | Siddiqui | G06N 20/10 |

OTHER PUBLICATIONS

Markl, Volker et al.; Robust Query Processing through Progressive Optimization; SIGMOD; Jun. 13-18, 2004; 12 pages.

* cited by examiner

*Primary Examiner* — Grace Park
(74) *Attorney, Agent, or Firm* — Schmeiser, Olsen & Watts, LLP; Stephanie Carusillo (57) ABSTRACT

An approach is provided for evaluating a performance of a query. A risk of selecting a low performance access path for a query is determined. The risk is determined to exceed a risk threshold. Based on the risk exceeding the risk threshold and using a machine learning optimizer, first costs of access paths for the query are determined. Using a cost-based database optimizer, second costs of the access paths are determined. Using a strong classifier operating on the first costs and the second costs, a final access path for the query is selected from the access paths.

20 Claims, 3 Drawing Sheets

EVALUATING QUERY PERFORMANCE

BACKGROUND

The present invention relates to managing query execution, and more particularly to predicting a performance of an access path of a query.

Access path selection is critical to Structured Query Language (SQL), due to its impact on the execution time of queries. An access path selection can change because of changes in catalog statistics, buffer pool size, and central processing unit (CPU) speed of processors. After a user applies multiple patches or migrates to a new version, old access paths of a significant number of queries may be changed to new access paths. A manual comparison of an old access path and a new access path determines whether the new access path provides improved or degraded query performance.

SUMMARY

In one embodiment, the present invention provides a method of evaluating a performance of a query. The method includes determining, by one or more processors, a risk of selecting an access path for a query which provides a performance of the query that does not exceed a performance threshold. The method further includes determining, by the one or more processors, that the risk exceeds a risk threshold. The method further includes based on the risk exceeding the risk threshold and using a machine learning optimizer that employs a machine learning system, determining, by the one or more processors, first costs of access paths for the query. The method further includes using a cost-based database optimizer, determining, by the one or more processors, second costs of the access paths for the query. The method further includes using a strong classifier operating on the first costs and the second costs, selecting, by the one or more processors, a final access path for the query from the access paths.

In another embodiment, the present invention provides a computer program product which includes a computer readable storage medium having computer readable program code stored on the computer readable storage medium. The computer readable program code is executed by a central processing unit (CPU) of a computer system to cause the computer system to perform a method analogous to the method summarized above.

In another embodiment, the present invention provides a computer system including a central processing unit (CPU); a memory coupled to the CPU; and a computer readable storage medium coupled to the CPU. The computer readable storage medium contains instructions that are executed by the CPU via the memory to implement a method analogous to the method summarized above.

DETAILED DESCRIPTION

Overview

Known techniques for manually evaluating a new access path to determine whether the new access path improves or degrades query execution performance have a significant cost and require a substantial amount of labor. A database optimizer (i.e., query optimizer) is a database management system component that analyzes an SQL query and determines efficient execution mechanisms for executing the SQL query. A cost-based database optimizer may fail to select the most efficient access path for a query. For example, the optimizer may choose one access path over another access path based on the chosen access path having the lower cost of execution in terms of system resource usage (i.e., estimated input/output, CPU usage, and memory usage), but the other access path may be more efficient because it uses a particular index.

Embodiments of the present invention address the aforementioned unique challenges of evaluating query access paths for query performance by automatically detecting access paths that degrade query performance after the access paths are changed, thereby enhancing a traditional database optimizer. Embodiments of the present invention utilize a risk rate, a machine learning model, and a strong classifier to enhance a current database optimizer to improve the evaluation of access paths in terms of obtaining improved query performance. The risk rate indicates whether an access path is considered a risk (i.e., whether the access path provides a query performance that is below a predetermined performance threshold). In one embodiment, the enhanced optimizer method is used if an original access path is evaluated as being a risk; otherwise, a conventional optimizer method is used. In one embodiment, the selection of an access path is completed during bind time and based on bind time statistics, and not during runtime. In one embodiment, an assessment of risk of a selection of a low-performing access path and the use of a machine learning algorithm and a strong classifier to select a final access path enhances a conventional database optimizer.

Other embodiments of the present invention provide a machine learning model based on explain information and real count information to predict whether a new access path will degrade query performance as compared to an original access path. Embodiments disclosed herein receive and use a plan table, a cost table, and a predicate table as a basis for training a machine learning model, and execute suggested queries to obtain statistics by which a new access path is evaluated. The system advantageously predicts the performance of a new access path, especially in a case in which a significant number of queries have their access paths changes after multiple patches are applied.

In one embodiment, a query performance evaluation system generates queries to obtain result rows of query clauses (e.g., how many rows are qualified after applying one predicate, or how many rows are returned after tables are joined). The system trains a machine learning model based on the real count information and explain tables of the queries, and uses the machine learning model to predict the performance of an access path.

System for Evaluating Query Performance

Figure 1:
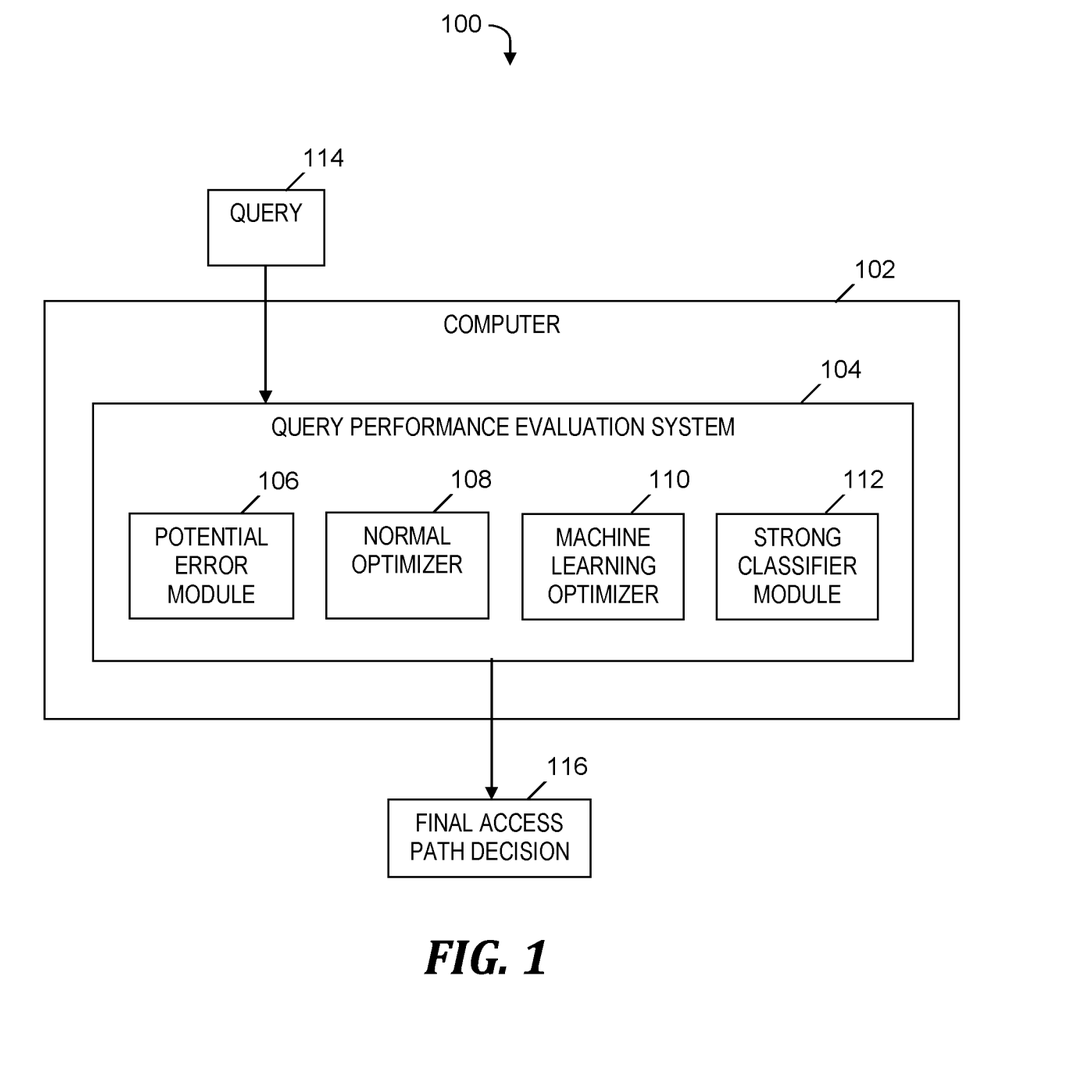
FIG. 1 is a block diagram of a system for evaluating a performance of a query, in accordance with embodiments of the present invention.

FIG. 1 is a block diagram of a system 100 for evaluating a performance of a query, in accordance with embodiments of the present invention. System 100 includes a computer 102, which executes a software-based query performance evaluation system 104, which includes a potential error module 106, a normal optimizer 108, a machine learning optimizer 110, and a strong classifier module 112. Query performance evaluation system 104 receives and parses a query 114. In one embodiment, query 114 is a SQL query that accesses data in a database (not shown).

Potential error module 106 determines whether there is a need for a strong classifier to determine a final access path decision 116 (i.e., a final selection of an access path for query 114). Potential error module 106 ranks a risk of selecting a low-performing access path for query 114. A low-performing access path is an access path that provides a performance of query 114 that does not exceed a predetermined performance threshold. To rank the aforementioned risk, potential error module 106 uses the parsed query 114 and statistics information (i.e., explain table information and count information) as input.

Query performance evaluation system 104 determines whether the aforementioned risk is high by determining whether the risk exceeds a predetermined risk threshold (i.e., determine whether there is a significant likelihood that the selected access path will be a low-performing access path).

If the aforementioned risk is not high, then normal optimizer 108 determines costs of access paths for query 114 and determines final access path decision 116, which specifies a final access path for query 114, without using machine learning optimizer 110. In one embodiment, normal optimizer 108 is a conventional query optimizer that uses a conventional cost-based optimization method to select an access path for executing a database query (e.g., query 114) that accesses data in a database (not shown).

If the aforementioned risk is high, then (1) machine learning optimizer 110 uses a machine learning system having a trained model to calculate predicted first costs of access paths for query 114 and (2) normal optimizer 108 calculates second costs for the access paths for query 114. After the first and second costs are calculated, strong classifier module 112 uses a boosted classifier to compare the costs in a combination of the first and second costs and determine final access path decision 116 (i.e., select a final access path for query 114).

After final access path decision 116 is determined by the strong classifier module 112, the database (not shown) applies the final access path selected for query 114 (i.e., the access path specified by final access path decision 116) to execute query 114.

Figure 2:
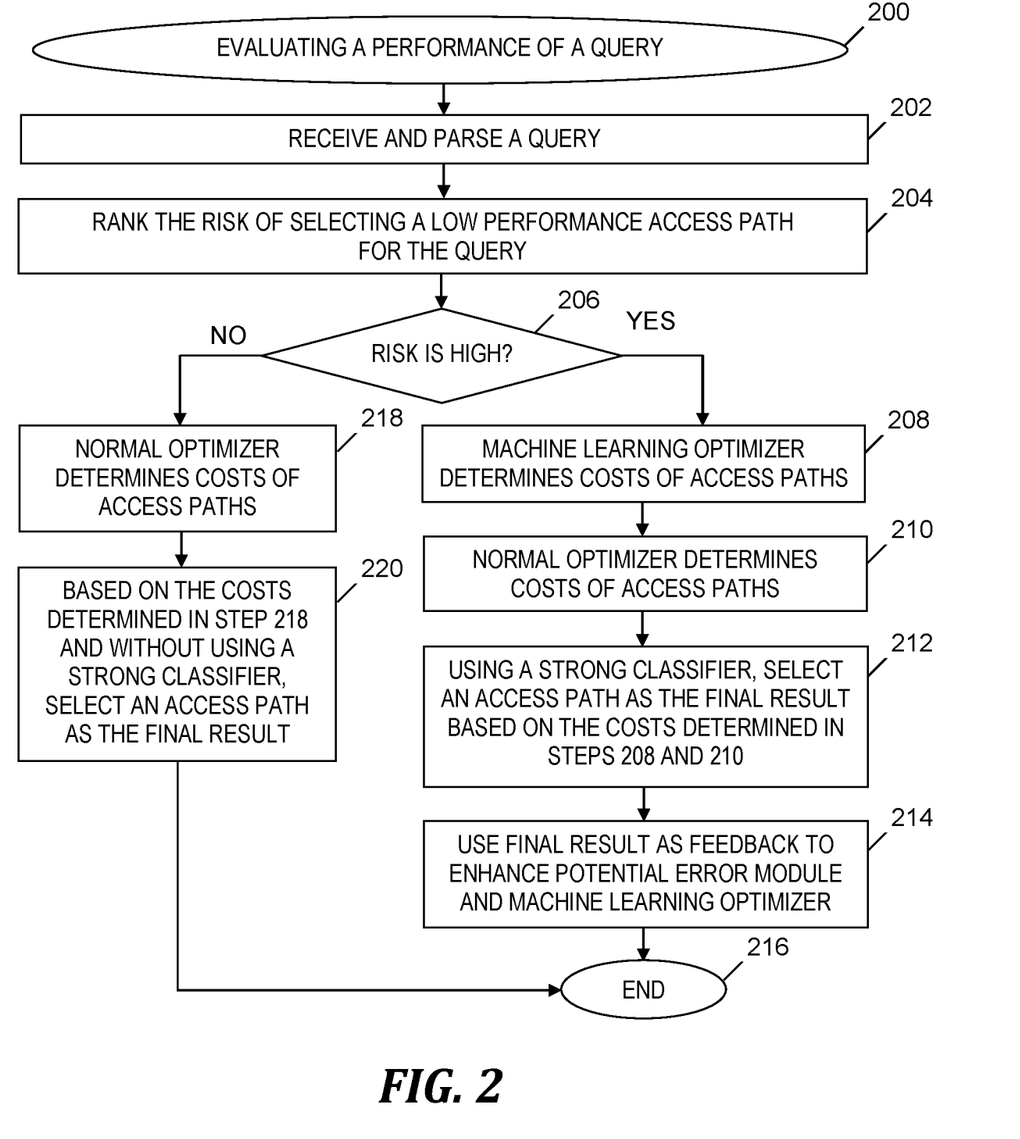
FIG. 2 is a flowchart of a process of evaluating a performance of a query, where the process is implemented in the system of FIG. 1, in accordance with embodiments of the present invention.
Figure 3:
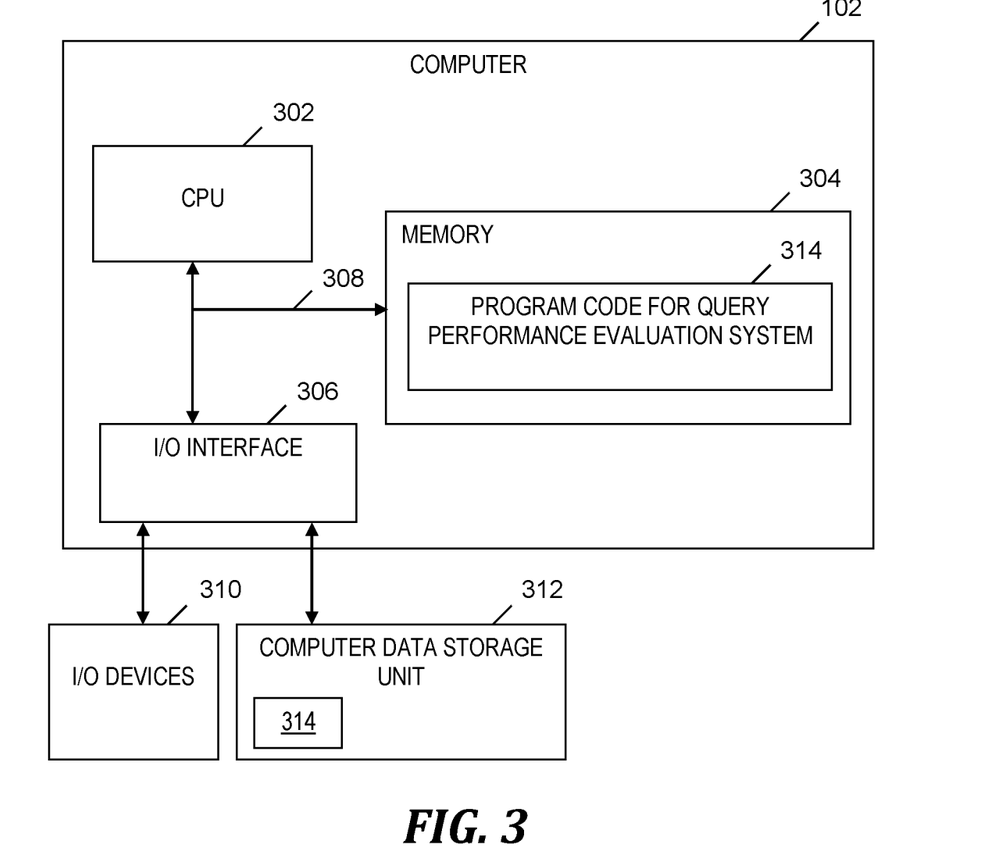
FIG. 3 is a block diagram of a computer included in the system of FIG. 1 and that implements the process of FIG. 2, in accordance with embodiments of the present invention.

The functionality of the components shown in FIG. 1 is described in more detail in the discussion of FIG. 2 and FIG. 3 presented below.

Process for Evaluating Query Performance

FIG. 2 is a flowchart of a process of evaluating a performance of a query, where the process is implemented in the system of FIG. 1, in accordance with embodiments of the present invention. The process of FIG. 2 starts at step 200. In step 202, query performance evaluation system 104 (see FIG. 1) receives and parses query 114 (see FIG. 1).

In step 204, potential error module 106 (see FIG. 1) determines and ranks a risk of selecting a low-performing access path for query 114 (see FIG. 1). A low-performing access path is defined as an access path that provides a performance of query 114 that does not exceed a predetermined performance threshold. In one embodiment, step 204 includes query performance evaluation system 104 (see FIG. 1) determining by predication whether a performance of an access path for query 114 (see FIG. 1) is low-performing or not.

In step 206, query performance evaluation system 104 (see FIG. 1) determines whether the risk determined in step 204 is high (i.e., whether the risk exceeds a predetermined risk threshold). If query performance evaluation system 104 (see FIG. 1) determines in step 206 that the risk determined in step 204 is high, then the Yes branch of step 206 is followed and step 208 is performed.

In step 208, machine learning optimizer 110 (see FIG. 1) determines costs of access paths for query 114 (see FIG. 1) by using a machine learning system that employs a machine learning algorithm and a machine learning model. In one embodiment, machine learning optimizer 110 (see FIG. 1) in step 208 determines (1) single table access path cost scoring by predicting the cost of accessing a single table using a particular access path; (2) join access path cost scoring by predicting the cost of performing a join using a particular access path; (3) sort access path cost scoring by predicting the cost of performing a sort on a given amount of data with a given sort key; (4) subquery cost scoring by predicting the cost of a correlated subquery and/or predicting the cost of a non-correlated subquery; and/or (5) prefetch cost scoring by predicting the cost of List Prefetch and/or predicting the cost of Dynamic Prefetch.

In one embodiment, for single table queries, single table with list prefetch, and single table with table scan, machine learning optimizer 110 (see FIG. 1) obtains training data by running each query received by query performance evaluation system 104 (see FIG. 1) with a different access path each time. The training data includes access path information (i.e., information describing access to a single table), actual cost (e.g., CPU time or elapsed time), and an optimizer's estimated cost to compare against a cost predicted by the machine learning system.

For a table join, machine learning optimizer 110 (see FIG. 1) obtains training data by running each query received by query performance evaluation system 104 (see FIG. 1) with a different access path each time. The training data includes access path information that describes the inputs to a single join (i.e., inner table, outer table, and join information), actual cost (e.g., CPU time or elapsed time), and an optimizer's estimated cost to compare against a cost predicted by the machine learning system. The training result includes nest loop join without sparse index, nest loop join with sparse index, nest loop join with sort composite, sort merge join with sort composite, sort merge join with sort new, sort merge join with sort both, hybrid join with sort new, hybrid join with sort composite, and/or hybrid join without sort.

In step 210, normal optimizer 108 (see FIG. 1) determines costs of access paths for query 114 (see FIG. 1) by using a conventional cost-based query optimization technique.

In step 212, query performance evaluation system 104 (see FIG. 1) selects an access path as the final access path decision 116 (see FIG. 1) by using a strong classifier that compares the combination of costs determined in steps 208 and 210. In one embodiment, strong classifier module 112 (see FIG. 1) performs step 212.

In one embodiment, query performance evaluation system 104 (see FIG. 1) in step 212 uses an adaptive boosting machine learning meta-algorithm to compare the first costs determined by machine learning optimizer 110 (see FIG. 1) and second costs determined by normal optimizer 108 (see FIG. 1) to select an optimal access path for query 114 (see FIG. 1). In one embodiment, query performance evaluation system 104 (see FIG. 1) applies the adaptive boosting machine learning meta-algorithm to every process of the calculation and to every query block.

In step 214, query performance evaluation system 104 (see FIG. 1) enhances potential error module 106 (see FIG. 1) and machine learning optimizer 110 (see FIG. 1) by using final access path decision 116 (see FIG. 1) as feedback to potential error module 106 (see FIG. 1) and machine learning optimizer 110 (see FIG. 1).

After step 212, a database management system applies the access path selected in step 212 to execute query 114 (see FIG. 1) to generate execution information. Query performance evaluation system 104 (see FIG. 1) receives and compares the execution information for multiple performances of the process of FIG. 2 and uses the execution information as feedback to make the strong classifier more accurate.

After step 214, the process of FIG. 2 ends at step 216.

Returning to step 206, if query performance evaluation system 104 (see FIG. 1) determines that the risk determined in step 204 is not high, then the No branch of step 206 is followed and step 218 is performed.

In step 218, normal optimizer 108 (see FIG. 1) determines costs of access paths for query 114 (see FIG. 1).

In step 220, based on the costs determined in step 218, and without using a strong classifier and without using a machine learning algorithm, query performance evaluation system 104 (see FIG. 1) selects an access path to be the final access path decision 116 (see FIG. 1).

After step 220, the process of FIG. 2 ends at step 216.

In one embodiment the process of FIG. 2 occurs during bind time and not during runtime. Bind time is a time during which query performance evaluation system 104 (see FIG. 1) invokes a BIND command that prepares SQL statements stored in a bind file generated by a pre-compiler and creates a package that is stored in the database.

In one embodiment, query performance evaluation system 104 (see FIG. 1) evaluates an access path using a machine learning model that is managed by the aforementioned machine learning system by following the steps presented below:

Step 1: Query performance evaluation system 104 (see FIG. 1) generates queries to obtain result rows of query clauses (also referred to herein as count information or real count information), including (i) how many rows are qualified after applying one predicate and (ii) how many rows are returned after tables are joined. Obtaining the count information overcomes a limitation of conventional optimizers that estimate the cost of an access path based on statistics, whereby the cost may be underestimated or overestimated in certain situations, especially when data distribution is not uniform.

In Step 1, query performance evaluation system 104 (see FIG. 1) generates queries to collect count information within rules. For example, query performance evaluation system 104 (see FIG. 1) can obtain a total number of rows for one table on which user workload queries are based and a result set of rows after applying a where condition. With the obtained information, query performance evaluation system 104 (see FIG. 1) evaluates the actual filter factor of this predicate. The example query in the user workload is presented below:

```
SELECT QW01.CTAL_NUM, QW01.IR_NUM
FROM QW01, PT05
WHERE QW01.BU_NUM>105
AND PT05.AL_ORDER IN ('201','403','507')
AND QW01.IR_NUM = PT05.IR._NUM
```

In this example, query performance evaluation system 104 (see FIG. 1) generates the following queries to collect the real count information, where each of the generated queries is based on the WHERE clause in the user workload example query or on a portion of the aforementioned WHERE clause:

```
a.    SELECT COUNT(*)
      FROM QW01
      WHERE QW01.BU_NUM>105
b.    SELECT COUNT(*)
      FROM PT05
      WHERE PT05.AL_ORDER IN ('201','403','507')
c.    SELECT COUNT(*)
      FROM QW01, PT05
      WHERE QW01.BU_NUM>105
      AND PT05.AL_ORDER IN ('201','403','507')
      AND QW01.IR_NUM = PT05.IR_NUM
```

There is no need to run all the generated queries to collect count information every time. After executing the generated queries the first time, query performance evaluation system 104 (see FIG. 1) compares the result set with the estimated rows. If the estimated rows are close to the real count, and there is no data change, query performance evaluation system 104 (see FIG. 1) can skip running the query and instead run the query the next time.

In step 1, query performance evaluation system 104 (see FIG. 1) receives explain tables and logs as input and generates the suggested queries to collect the count information as output. In one embodiment, the explain tables include plan tables and predicate tables.

Step 2: Query performance evaluation system 104 (see FIG. 1) trains the machine learning model by a supervised machine learning algorithm based on the real count information and explain tables of the queries. Explain tables contain information about a performance of SQL statements and functions that run on a database management system. Each row in an explain table describes an aspect of a step in the execution of a query or subquery in an explainable statement. In one embodiment, an explainable statement is a valid XQuery statement or one of the following SQL statements: CALL, Compound SQL (Dynamic), DELETE, INSERT, MERGE, REFRESH, SELECT, SELECT INTO, SET INTEGRITY, UPDATE, VALUES, or VALUES INTO. In another embodiment, an explainable statement is a SELECT, MERGE, or INSERT statement, or the searched form of an UPDATE or DELETE statement. The column values of a row of an explain table identify the query or subquery, the tables and other objects involved in the execution of the query or subquery, the methods used to carry out each step in the execution, and cost information about the methods used to carry out each step in the execution.

In step 2, query performance evaluation system 104 (see FIG. 1) extracts features of access paths based on explain tables. In one embodiment, the explain tables include a plan table, an estimated cost table, and a predicate table.

The plan table contains information about access paths that is collected from the results of explain statements and includes the following columns (which is not an exhaustive list of columns in a plan table):

QUERYNO: a number that identifies the statement that is being explained.

QBLOCKNO: a number that identifies each query block within a query.

PLANNO: the number of the step in which the query that is indicated in QBLOCKNO was processed. This column indicates the order in which the steps were executed.

TABLENAME: the name of a table.

ACCESSTYPE: the method of accessing the new table. For example, a value of I indicates an access by an index identified in INDEXNAME.

INDEXNAME: the name of the index.

INDEXONLY: indication of whether access to an index alone is enough to perform the step, or indication of whether data too must be accessed.

MATCHCOLS: the number of index keys that are used in an index scan.

PREFETCH: indication of whether data pages are to be read in advance by prefetch. For example, a value of S indicates a pure sequential prefetch.

The estimated cost table contains information about detailed cost estimation of plans in a query and includes the following columns (which is not an exhaustive list of columns in a cost table):

QUERYNO: a number that identifies the statement that is being explained.

QBLOCKNO: a number that identifies each query block within a query.

PLANNO: the plan number, which is a number used to identify each plan with a query block.

IMFF: the filter factor of matching predicates only.

IMFFADJ: the filter factor of matching and screening predicates.

ONECOMPROWS: the number of rows qualified after applying local predicates.

COMPCARD: the total composite cardinality.

TOTALCOST: the total cost.

Query performance evaluation system 104 (see FIG. 1) calculates actual values for IMFF, ONECOMPROWS, and COMPCARD based on the count information obtained in Step 1. Query performance evaluation system 104 (see FIG. 1) obtains different access paths for a single query, and based on the aforementioned actual values, marks the access paths with a tag indicating "Good" or "Bad." The "Good" tag indicates an access path that provides good query performance (i.e., a measure of performance that exceeds a performance threshold). The "Bad" tag indicates an access path that provides inefficient query performance (i.e., a measure of performance that does not exceed the performance threshold). In one embodiment, marking an access path with a tag includes adding a tag indicator as a column added to the rows described above for a plan table.

Step 2 also includes query performance evaluation system 104 (see FIG. 1) training the machine learning model with a supervised algorithm such as Support Vector Machine (SVM) or neural network. Using the supervised algorithm, query performance evaluation system 104 (see FIG. 1) builds a relationship between features and the tags of "Good" or "Bad."

Step 3: Query performance evaluation system 104 (see FIG. 1) uses the machine learning model to predict the performance of an access path of query 114 (see FIG. 1). For a new access path of queries, query performance evaluation system 104 (see FIG. 1) obtains the explain tables and generates suggested count queries to collect count information responding to the queries which have the new access path. Using the explain tables and the result of the count queries, query performance evaluation system 104 (see FIG. 1) uses the classification provided by the machine learning model to evaluate the new access path. The evaluation determines whether the new access path is a regressive access path.

Computer System

FIG. 3 is a block diagram of a computer included in the system of FIG. 1 and that implements the process of FIG. 2, in accordance with embodiments of the present invention. Computer 102 is a computer system that generally includes a central processing unit (CPU) 302, a memory 304, an input/output (I/O) interface 306, and a bus 308. Further, computer 102 is coupled to I/O devices 310 and a computer data storage unit 312. CPU 302 performs computation and control functions of computer 102, including executing instructions included in program code 314 for query performance evaluation system 104 (see FIG. 1) to perform a method of evaluating a performance of a query, where the instructions are executed by CPU 302 via memory 304. CPU 302 may include a single processing unit or be distributed across one or more processing units in one or more locations (e.g., on a client and server).

Memory 304 includes a known computer readable storage medium, which is described below. In one embodiment, cache memory elements of memory 304 provide temporary storage of at least some program code (e.g., program code 314) in order to reduce the number of times code must be retrieved from bulk storage while instructions of the program code are executed. Moreover, similar to CPU 302, memory 304 may reside at a single physical location, including one or more types of data storage, or be distributed across a plurality of physical systems in various forms. Further, memory 304 can include data distributed across, for example, a local area network (LAN) or a wide area network (WAN).

I/O interface 306 includes any system for exchanging information to or from an external source. I/O devices 310 include any known type of external device, including a display, keyboard, etc. Bus 308 provides a communication link between each of the components in computer 102, and may include any type of transmission link, including electrical, optical, wireless, etc.

I/O interface 306 also allows computer 102 to store information (e.g., data or program instructions such as program code 314) on and retrieve the information from computer data storage unit 312 or another computer data storage unit (not shown). Computer data storage unit 312 includes a known computer readable storage medium, which is described below. In one embodiment, computer data storage unit 312 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 304 and/or storage unit 312 may store computer program code 314 that includes instructions that are executed by CPU 302 via memory 304 to evaluate a performance of a query. Although FIG. 3 depicts memory 304 as including program code, the present invention contemplates embodiments in which memory 304 does not include all of code 314 simultaneously, but instead at one time includes only a portion of code 314.

Further, memory 304 may include an operating system (not shown) and may include other systems not shown in FIG. 3.

In one embodiment, computer data storage unit 312 includes a data repository of statistics received by query performance evaluation system 104 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to evaluating a performance of a query. Thus, an embodiment of the present invention discloses a process for supporting computer infrastructure, where the process includes providing at least one support service for at least one of integrating, hosting, maintaining and deploying computer-readable code (e.g., program code 314) in a computer system (e.g., computer 102) including one or more processors (e.g., CPU 302), wherein the processor(s) carry out instructions contained in the code causing the computer system to evaluate a performance of a query. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of evaluating a performance of a query.

While it is understood that program code 314 for evaluating a performance of a query may be deployed by manually loading directly in client, server and proxy computers (not shown) via loading a computer-readable storage medium (e.g., computer data storage unit 312), program code 314 may also be automatically or semi-automatically deployed into computer 102 by sending program code 314 to a central server or a group of central servers. Program code 314 is then downloaded into client computers (e.g., computer 102) that will execute program code 314. Alternatively, program code 314 is sent directly to the client computer via e-mail. Program code 314 is then either detached to a directory on the client computer or loaded into a directory on the client computer by a button on the e-mail that executes a program that detaches program code 314 into a directory. Another alternative is to send program code 314 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 314 is transmitted to the proxy server and then it is stored on the proxy server.

Another embodiment of the invention provides a method that performs the process steps on a subscription, advertising and/or fee basis. That is, a service provider can offer to create, maintain, support, etc. a process of evaluating a performance of a query. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 304 and computer data storage unit 312) having computer readable program instructions 314 thereon for causing a processor (e.g., CPU 302) to carry out aspects of the present invention.

The computer readable storage medium can be a tangible device that can retain and store instructions (e.g., program code 314) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 314) described herein can be downloaded to respective computing/processing devices (e.g., computer 102) from a computer readable storage medium or to an external computer or external storage device (e.g., computer data storage unit 312) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 314) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 3) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 314).

These computer readable program instructions may be provided to a processor (e.g., CPU 302) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 312) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 314) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of evaluating a performance of a query, the method comprising:
   determining, by one or more processors, a risk of selecting an access path for a query which provides a performance of the query that does not exceed a performance threshold, wherein the determining the risk is based on real count information, explain tables, and a machine learning model, wherein the real count information includes result rows of clauses of the query, the result rows including (i) an amount of rows that are qualified after applying a predicate and (ii) an amount of rows that are returned after tables in the query are joined, wherein the explain tables include information about a performance of SQL statements and functions included in an execution of the query, and wherein the machine learning model is trained for predicting a performance of the access path and is based on the real count information and the explain tables;
   determining, by the one or more processors, that the risk exceeds a risk threshold;
   based on the risk exceeding the risk threshold and using a machine learning optimizer that employs a machine learning system, determining, by the one or more processors, first costs of access paths for the query;
   using a cost-based database optimizer, determining, by the one or more processors, second costs of the access paths for the query; and
   using a strong classifier operating on the first costs and the second costs, selecting, by the one or more processors, a final access path for the query from the access paths.

2. The method of claim 1, further comprising:
   performing, by the one or more processors, the determining the risk and the determining that the risk exceeds the risk threshold by using a potential error module; and
   sending the final access path as feedback to enhance the potential error module and the machine learning system.

3. The method of claim 1, further comprising:
   prior to the determining the risk, receiving, by the one or more processors, the query; and
   parsing, by the one or more processors, the query, wherein the query in the determining the risk, the determining the first costs, the determining the second costs, and the selecting the final access path is the parsed query.

4. The method of claim 1, further comprising:
   receiving and parsing, by the one or more processors, a second query;
   determining, by the one or more processors and a potential error module, a second risk of selecting a second access path for the parsed second query which provides a second performance of the parsed second query that does not exceed the performance threshold;
   determining, by the one or more processors, that the second risk does not exceed the risk threshold;
   based on the second risk not exceeding the risk threshold, using the cost-based database optimizer, and without using the machine learning system, determining, by the one or more processors, third costs of second access paths for the parsed second query; and based on the third costs and without using the strong classifier, selecting, by the one or more processors, a second final access path for the second query from the second access paths.

5. The method of claim 1, further comprising providing a first performance of the query using the final access path that exceeds a second performance of the query using another access path determined by the cost-based database optimizer, without using the machine learning system, and without using the strong classifier.

6. The method of claim 1, wherein the determining the risk includes:
receiving historical training data for a risk prediction model; and
based on the historical training data and using the risk prediction model and a logical classifier, the machine learning optimizer determining the risk of selecting the access path for the query which provides the performance of the query that does not exceed the performance threshold.

7. The method of claim 1, wherein the selecting the final access path for the query includes employing a machine learning algorithm that uses a boosted classifier to select the final access path based on a combination of the first costs and the second costs.

8. The method of claim 1, further comprising:
providing at least one support service for at least one of creating, integrating, hosting, maintaining, and deploying computer readable program code in the computer, the program code being executed by a processor of the computer to implement the determining the risk, the determining that the risk exceeds the risk threshold, the determining the first costs of the access paths, the determining the second costs of the access paths, and the selecting the final access path.

9. A computer program product comprising:
a computer readable storage medium having computer readable program code stored on the computer readable storage medium, the computer readable program code being executed by a central processing unit (CPU) of a computer system to cause the computer system to perform a method of evaluating a performance of a query, the method comprising the steps of:
the computer system determining a risk of selecting an access path for a query which provides a performance of the query that does not exceed a performance threshold, wherein the determining the risk is based on real count information, explain tables, and a machine learning model, wherein the real count information includes result rows of clauses of the query, the result rows including (i) an amount of rows that are qualified after applying a predicate and (ii) an amount of rows that are returned after tables in the query are joined, wherein the explain tables include information about a performance of SQL statements and functions included in an execution of the query, and wherein the machine learning model is trained for predicting a performance of the access path and is based on the real count information and the explain tables;
the computer system determining that the risk exceeds a risk threshold;
based on the risk exceeding the risk threshold and using a machine learning optimizer that employs a machine learning system, the computer system determining first costs of access paths for the query;
using a cost-based database optimizer, the computer system determining second costs of the access paths for the query; and
using a strong classifier operating on the first costs and the second costs, the computer system selecting a final access path for the query from the access paths.

10. The computer program product of claim 9, wherein the method further comprises:
the computer system performing the determining the risk and the determining that the risk exceeds the risk threshold by using a potential error module; and
the computer system sending the final access path as feedback to enhance the potential error module and the machine learning system.

11. The computer program product of claim 9, wherein the method further comprises:
prior to the determining the risk, the computer system receiving the query; and
the computer system parsing the query, wherein the query in the determining the risk, the determining the first costs, the determining the second costs, and the selecting the final access path is the parsed query.

12. The computer program product of claim 9, wherein the method further comprises:
the computer system receiving and parsing a second query;
the computer system determining, by a potential error module, a second risk of selecting a second access path for the parsed second query which provides a second performance of the parsed second query that does not exceed the performance threshold;
the computer system determining that the second risk does not exceed the risk threshold;
based on the second risk not exceeding the risk threshold, using the cost-based database optimizer, and without using the machine learning system, the computer system determining third costs of second access paths for the parsed second query; and
based on the third costs and without using the strong classifier, the computer system selecting a second final access path for the second query from the second access paths.

13. The computer program product of claim 9, wherein the method further comprises the computer system providing a first performance of the query using the final access path that exceeds a second performance of the query using another access path determined by the cost-based database optimizer, without using the machine learning system, and without using the strong classifier.

14. The computer program product of claim 9, wherein the determining the risk includes:
receiving historical training data for a risk prediction model; and
based on the historical training data and using the risk prediction model and a logical classifier, the machine learning optimizer determining the risk of selecting the access path for the query which provides the performance of the query that does not exceed the performance threshold.

15. A computer system comprising:
a central processing unit (CPU);
a memory coupled to the CPU; and
a computer readable storage medium coupled to the CPU, the computer readable storage medium containing instructions that are executed by the CPU via the memory to implement a method of evaluating a performance of a query, the method comprising the steps of:
- the computer system determining a risk of selecting an access path for a query which provides a performance of the query that does not exceed a performance threshold, wherein the determining the risk is based on real count information, explain tables, and a machine learning model, wherein the real count information includes result rows of clauses of the query, the result rows including (i) an amount of rows that are qualified after applying a predicate and (ii) an amount of rows that are returned after tables in the query are joined, wherein the explain tables include information about a performance of SQL statements and functions included in an execution of the query, and wherein the machine learning model is trained for predicting a performance of the access path and is based on the real count information and the explain tables;
- the computer system determining that the risk exceeds a risk threshold;
- based on the risk exceeding the risk threshold and using a machine learning optimizer that employs a machine learning system, the computer system determining first costs of access paths for the query;
- using a cost-based database optimizer, the computer system determining second costs of the access paths for the query; and
- using a strong classifier operating on the first costs and the second costs, the computer system selecting a final access path for the query from the access paths.

16. The computer system of claim 15, wherein the method further comprises:
- the computer system performing the determining the risk and the determining that the risk exceeds the risk threshold by using a potential error module; and
- the computer system sending the final access path as feedback to enhance the potential error module and the machine learning system.

17. The computer system of claim 15, wherein the method further comprises:
- prior to the determining the risk, the computer system receiving the query; and
- the computer system parsing the query, wherein the query in the determining the risk, the determining the first costs, the determining the second costs, and the selecting the final access path is the parsed query.

18. The computer system of claim 15, wherein the method further comprises:
- the computer system receiving and parsing a second query;
- the computer system determining, by a potential error module, a second risk of selecting a second access path for the parsed second query which provides a second performance of the parsed second query that does not exceed the performance threshold;
- the computer system determining that the second risk does not exceed the risk threshold;
- based on the second risk not exceeding the risk threshold, using the cost-based database optimizer, and without using the machine learning system, the computer system determining third costs of second access paths for the parsed second query; and
- based on the third costs and without using the strong classifier, the computer system selecting a second final access path for the second query from the second access paths.

19. The computer system of claim 15, wherein the method further comprises the computer system providing a first performance of the query using the final access path that exceeds a second performance of the query using another access path determined by the cost-based database optimizer, without using the machine learning system, and without using the strong classifier.

20. The computer system of claim 15, wherein the determining the risk includes:
- receiving historical training data for a risk prediction model; and
- based on the historical training data and using the risk prediction model and a logical classifier, the machine learning optimizer determining the risk of selecting the access path for the query which provides the performance of the query that does not exceed the performance threshold.

* * * * *